(12) United States Patent
Idicula et al.

(10) Patent No.: US 9,665,572 B2
(45) Date of Patent: May 30, 2017

(54) OPTIMAL DATA REPRESENTATION AND AUXILIARY STRUCTURES FOR IN-MEMORY DATABASE QUERY PROCESSING

(75) Inventors: Sam Idicula, Santa Clara, CA (US); Kevin Moore, San Francisco, CA (US); Brian Gold, Redwood City, CA (US); Nipun Agarwal, Saratoga, CA (US); Eric Sedlar, Portola Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 109 days.

(21) Appl. No.: 13/611,479

(22) Filed: Sep. 12, 2012

(65) Prior Publication Data

US 2014/0074819 A1    Mar. 13, 2014

(51) Int. Cl.
*G06F 17/30* (2006.01)

(52) U.S. Cl.
CPC ........ *G06F 17/30* (2013.01); *G06F 17/30289* (2013.01); *G06F 17/30312* (2013.01)

(58) Field of Classification Search
CPC ............... G06F 17/30312; G06F 17/30; G06F 17/30289; G06F 17/30424; G06F 17/30876
USPC ........................................................ 707/719
See application file for complete search history.

(56) References Cited

U.S. PATENT DOCUMENTS

| | | | | |
|---|---|---|---|---|
| 6,029,163 A * | 2/2000 | Ziauddin | ........... | G06F 17/30463 |
| 7,024,616 B2 * | 4/2006 | Ohira | .................... | H04L 1/0083 |
| | | | | 714/723 |
| 8,472,516 B2 * | 6/2013 | Tong | ....................... | H04N 19/00 |
| | | | | 375/240 |
| 8,503,809 B2 * | 8/2013 | Fukuhara | ............... | H04N 19/63 |
| | | | | 341/106 |
| 9,432,298 B1 * | 8/2016 | Smith | .................. | H04L 49/9057 |
| 2006/0265351 A1 * | 11/2006 | Day | ................... | G06F 17/30522 |
| 2010/0088309 A1 * | 4/2010 | Petculescu et al. | .......... | 707/714 |
| 2010/0114976 A1 * | 5/2010 | Castellanos et al. | ......... | 707/803 |

(Continued)

OTHER PUBLICATIONS

Oveview of the Oracle Exadata Database Machine and Exadata Storage Server: http://www.oracle.com/technetwork/database/exadata/exadata-technical-whitepaper-134575.pdf, dated Jun. 2012, 36 pages.

(Continued)

*Primary Examiner* — Merilyn Nguyen
(74) *Attorney, Agent, or Firm* — Hickman Palermo Becker Bingham LLP

(57) ABSTRACT

A method for providing optimized data representation of relations for in-memory database query processing is disclosed. The method seeks to optimize the use of the available memory by encoding relations on which the in-memory database query processing is performed and by employing auxiliary structures to maintain performance. Relations are encoded based on data patterns in one or more attribute-columns of the relation and the encoding that is selected is suited to a particular type of data in the column. Members of a set of auxiliary structures are selected based on the benefit the structure can provide and the cost of the structure in terms of the amount of memory used. Encoding of the relations is performed in real-time while query processing occurs, using locks to eliminate conflicts between the query processing and encoding.

25 Claims, 6 Drawing Sheets

(56) References Cited

U.S. PATENT DOCUMENTS

| | | | |
|---|---|---|---|
| 2011/0213766 A1* | 9/2011 | Hong | G06F 17/30312 707/718 |
| 2012/0084278 A1* | 4/2012 | Franke | G06F 17/30587 707/719 |
| 2012/0323929 A1* | 12/2012 | Kimura | G06F 17/30339 707/748 |
| 2013/0086353 A1* | 4/2013 | Colgrove et al. | 711/206 |
| 2013/0232176 A1* | 9/2013 | Plattner | G06F 17/30289 707/803 |
| 2014/0067791 A1* | 3/2014 | Idicula | G06F 17/30457 707/714 |
| 2014/0122452 A1* | 5/2014 | Faerber et al. | 707/693 |

OTHER PUBLICATIONS

D.J. Abadi, S. Madden, and M. Ferreira., "Integrating Compression and Execution in Column-Oriented Database Systems", In ACM SIGMOD Conference, dated 2006, 12 pages.

Jun Rao, Kenneth A. Ross: "Making B+-Trees Cache Conscious in Main Memory", In ACM SIGMOD Conference, dated 2000, 12 pages.

* cited by examiner

OPTIMAL DATA REPRESENTATION AND AUXILIARY STRUCTURES FOR IN-MEMORY DATABASE QUERY PROCESSING

CROSS-REFERENCE TO RELATED APPLICATIONS

Background

Relational database query processing has been optimized for a traditional processing model that assumes a set of tightly-coupled, very fast central processors and a very large (on the order of 100 Terabytes), but relatively slow disk system, which has sufficient capacity to store all of the needed tables. A virtualized memory, including terabytes of main memory, between the processor and the disk system helps avoid costly disk I/O operations. However, the fast central processors and large disk systems are expensive and consume large amounts of power (on the order of 10 kW).

New lower cost and lower power processing models are available, partly because the cost per bit of main memory such as DRAM has dropped substantially. One such model is a cluster having a large number of processing units, each including a low-speed processor, modest amounts of main memory compared to the amount of storage in a disk system, and no persistent storage by which the main memory is virtually extended. In this model, a cluster may have as many as 1000 processing units.

The large number of processing units in a cluster has very high aggregate computing power and memory, if each of the processing units can be properly utilized. This potentially high performance makes a cluster attractive for query processing, but the disk-based model poses problems when the query processing is moved to in-memory database processing.

BRIEF DESCRIPTION OF THE DRAWINGS

A more complete appreciation of the embodiments and many of the attendant advantages thereof will be readily obtained as the same becomes better understood by reference to the following detailed description when considered in connection with the accompanying drawings, wherein.

DETAILED DESCRIPTION

Overview

An embodiment adapts the disk-based query processing to in-memory database query processing, which requires that the amount of memory and the compute and memory bandwidth used be minimized, while maintaining performance. To minimize memory and bandwidths, data structures on which the queries operate are adapted to the size of the memory. To maintain performance, an optimal set of auxiliary data structures is kept in memory.

Figure 1:
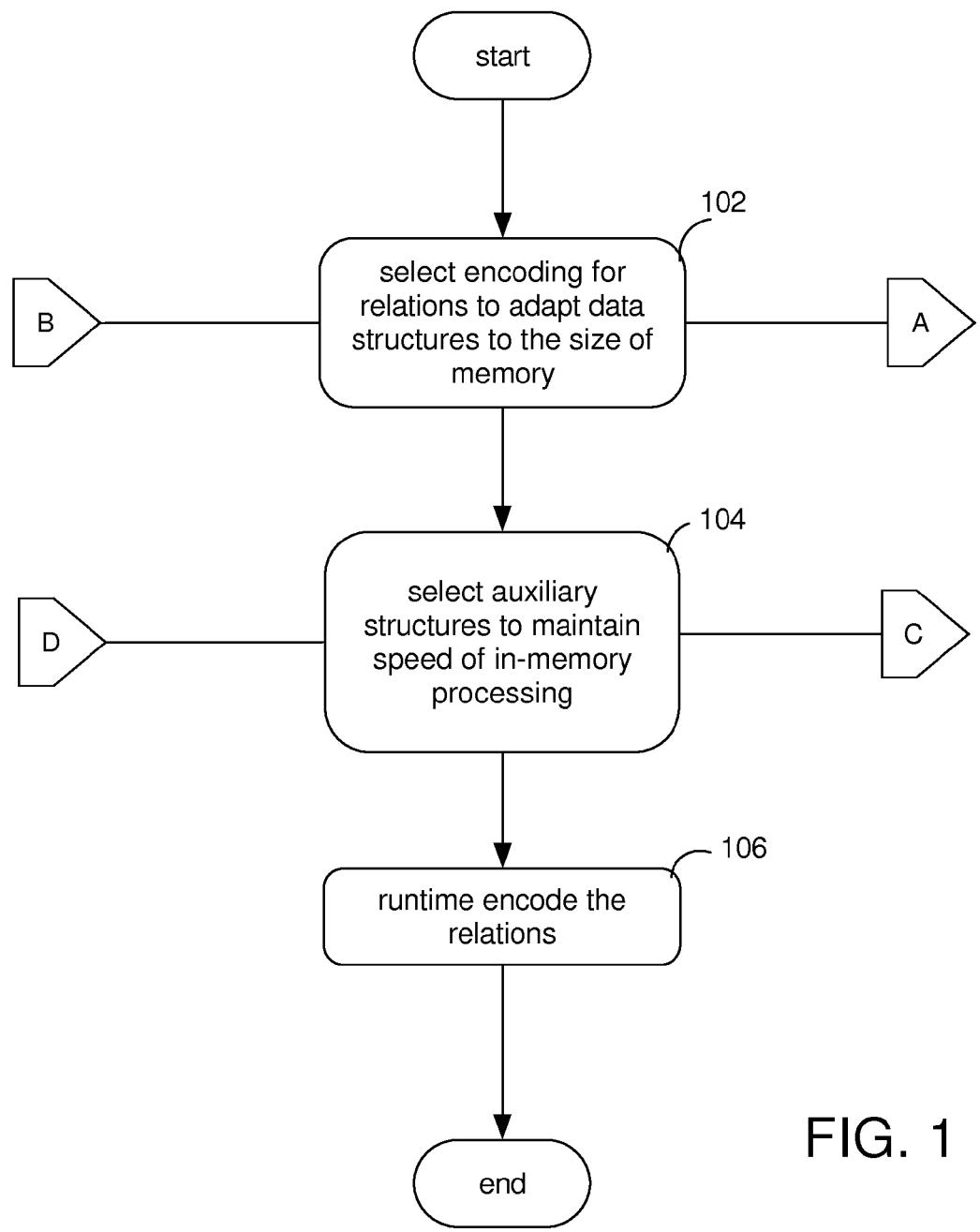
FIG. 1 depicts an example process for carrying out an embodiment.

In an embodiment depicted in FIG. 1, the system selects encodings in step 10 for columns in a relation to adapt the relation to the size of the memory. The cost of the encoding based on query operations in the query workload determines the encoding selections. In the embodiment, maintaining performance is accomplished by selecting auxiliary structures in step 12 based on the amount of memory and the benefit for each auxiliary structure. Actual encoding of the selected encodings proceeds in real time in step 14 while the system processes queries in memory. A system of locks assures that the real time encoding does not substantially interfere with the query processing.

Detailed Description

Candidate Encoding

Figure 2:
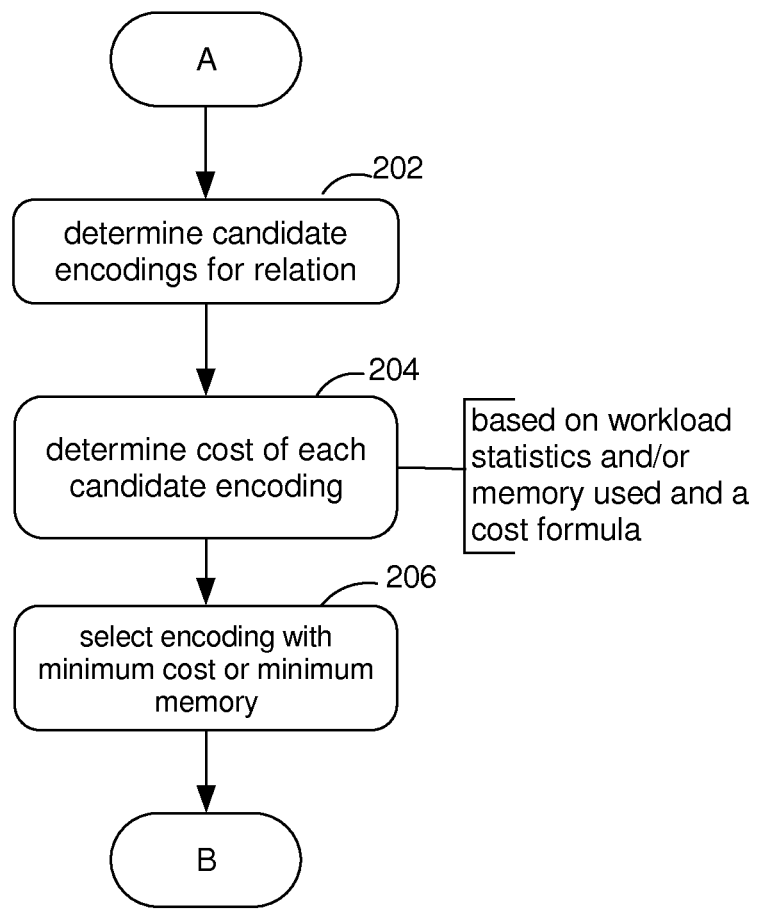
FIG. 2 depicts an example process for encoding a relation.

FIG. 2 depicts an example process for encoding a column in a relation. In step 202, the computer system determines the candidate encodings for a given column $C_j$. The computer system examines one or more candidate encodings for each column based on data stored in the column. The computer system considers the average length of the data in the column in bytes, the number of distinct data values in the column, and an average run length of data values in the column to select among possible encodings, such as dictionary encodings, run-length encodings, native integer encodings, scaled-decimal encodings, frame of reference encodings, string compression encodings, and bit maps. Each type of encoding is suitable for a particular type of data. For example, run length encoding is suited to columns that have long lengths of repetitious data, because such encoding can make a substantial reduction in the amount of memory the column uses. Frame of reference encodings are especially suited to numeric columns. LZ (Lempel-Ziv) compression is especially suited for string columns. Native integer encodings are best for arithmetic and numerical aggregates, and sorting operations. Native fixed length integer encodings are well-suited to cases in which filters are involved. Bit maps are especially well-suited to low cardinality columns. Dictionary encodings are a good choice when grouping operations are present.

Cost

The computer system determines the cost of each candidate encoding $E_k$ in step 204, after determining candidate encodings for a given column $C_j$, in step 202. In an embodiment, the cost reflects a given representative query workload, where the workload is characterized by types of operations, such as projections, groupings, and sorting operations, described in more detail below. In particular, for each given column $C_j$, statistics are gathered for each type of operation $O_i$ and for all queries ($\forall Q_m$) in the workload, where the statistics include the average number of rows processed $R[C_j, O_i]$, the fraction of query processing time (or estimated cost) taken by the operation on the column $F[C_j, O_i]$, and the average selectivity for filters on the column $S[C_j, O_i]$. The cost is computed from these statistics according to the following function:

(a) if the fraction of query processing time $F[C_j, O_i]$ is small or zero (meaning that the column is not used in the queries), then the cost is just the amount of memory used; and (b) if the fraction of query processing time $F[C_j, O_i]$ is not small, then compute the cost according to a particular cost formula for each candidate encoding $E_k$.

In one embodiment, the cost formula is:

$$\Sigma_o \text{Cost}[C_j, O_i] = \Sigma_o (\text{Cost}_{basic}[C_j, O_i] \cdot \text{AveLength}_{E_i} \cdot R[C_j, O_i] \cdot F[C_j, O_i]), \quad (1)$$

where the cost is computed over all operations, where $Cost_{basic}[C_j, O_i]$ is the basic cost of the query determined by running pre-designed pieces of code that approximate each query operation, $AveLength_{E_k}$ is the average length per row of the column's value for a particular encoding $E_k$, and where $R[C_j, O_i]$ and $F[C_j, O_i]$ are the statistics stated above. Thus, for a given average number of rows $R[C_j, O_i]$ and fraction $F[C_j, O_i]$, the cost is higher if the $AveLength_{E_i}$ is larger.

The system selects the encoding having the minimum memory or minimum cost, after the cost is determined.

Types of Operations For Workload Statistics

As mentioned above, the cost of each candidate encoding in one embodiment is based on operations found in a representative query workload. The types of operations considered in such a workload include at least filter, standard operators and functions, projection, grouping, and sorting operations.

Filter operations includes relational comparison operator such as "=", "<", ">" on the value of the column or the value of applying a function/operator on the column.

Standard operators and functions include arithmetic operators such as "+" and "−", string operations such as concatenation, "upper", "substr", as well as aggregation functions like "sum."

Projection operations involve decoding the data representation (decompressing) to get the value in the original representation for that data type, e.g., text for strings.

Grouping operations involve gathering all rows that have the same value for the group-by-column(s). Such operations typically involve the calculation of a hash function and probing of a hash table.

Sorting operations include sorting a relation or sub-relations by a set of columns.

Auxiliary Structures

Many query processes benefit from auxiliary structures, which speed up the processing of the query. Such structures include B-Trees, sorted representations, bit maps, bloom filters, and indexes.

B-Trees benefit columns that are frequently filtered with highly selective range predicates. The benefit of a B-Tree is even higher if the column is frequently the subject of a sort operation.

Sorted representations are arrays in which entries are (column-value, row-id) pairs sorted by column value. Columns that are frequently the subject of a sort operation benefit from sorted representations.

Bitmap structures are very useful for low-cardinality columns that are frequently filtered using equality conditions. The column has one bitmap for each distinct value and each bit map has as many bits are there are rows. For each row, the corresponding bit indicates whether the column's value in that row is the value of that the bitmap represents.

Bloom filter structures, in which hash functions map a set element to a bit array, are useful for filter operations having equality predicates. A bloom filter that represents a summary of the data values in a chunk can be used to skip a chunk if the given value is not present in the chunk (as indicated by a bit not present in the bloom filter).

Figure 3:
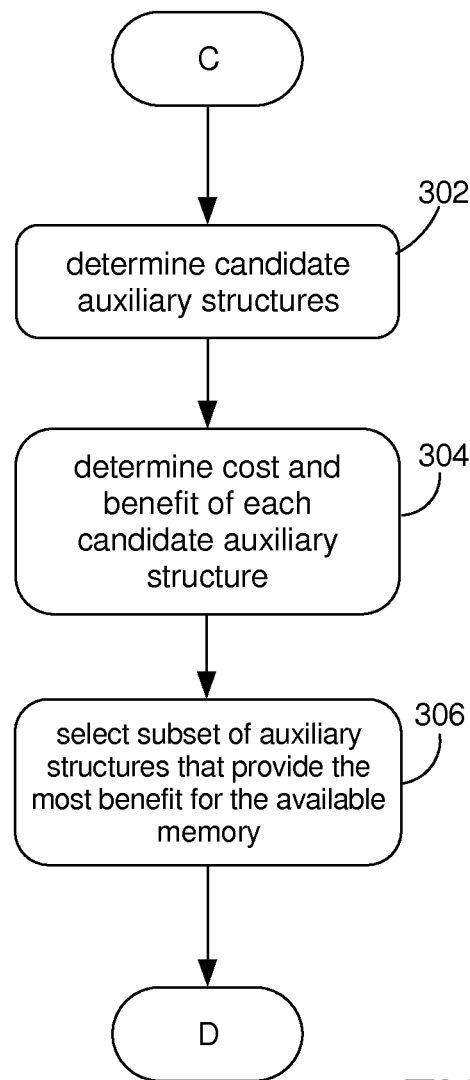
FIG. 3 depicts an example process for selecting auxiliary structures.

Given a certain quantity of available memory, it is desirable to choose a set of auxiliary structures that provides the most benefit at the least cost to in-memory database query operations, specifically, operations on columns. Therefore, the system chooses in step 302 of FIG. 3 columns that can benefit from auxiliary structures based on the types of operations on the column. For example, if a column has highly selective filter operations or a high frequency of sort operations, then a B-Tree index structure may provide a performance boost. Selecting a column that can benefit from an auxiliary structure is based on tunable threshold values to maintain control over the number of candidate auxiliary structures to be considered for the column.

For a given column and for each candidate structure in a set of auxiliary structures, an embodiment of the system determines, in step 304, a measure of the benefit $B_i$ that the candidate structure can provide to the given column and the cost, which is the amount of memory $M_i$ that the candidate auxiliary structure uses. The embodiment then decides, in step 306, on the subset of auxiliary structures that provide the most benefit for the available memory.

To help determine the cost of an auxiliary structure, available memory is divided into a number L of equal-sized chunks. Thus, the amount $M_i$ of memory needed for an auxiliary structure has a range of 1 to L chunks, meaning the structure can occupy one chunk or the entire amount of available memory. The actual number of chunks needed for an auxiliary structure depends on the length of the column as well as the type of auxiliary structure.

The benefit $B_i$ of an auxiliary structure i is a sum, over all applicable operations, of a product of an estimate of the improvement per row that the auxiliary structure provides for each applicable operation, the number of rows for the operation on that column $R[C_j, O_i]$, and the query cost fraction $F[C_j, O_i]$. Thus, the benefit of a particular structure is $$B_i = \Sigma_o(\text{improvement} \cdot R[C_j, O_i] \cdot F[C_j, O_i]). \quad (2)$$

Given a set of benefits $B=\{B_1 \ldots B_N\}$ for each candidate auxiliary structure and a set of costs $M=\{M_1 \ldots M_N\}$, in terms of memory needed, for each candidate structure, where N is the total number of candidate structures, the system computes the optimal set. Specifically, the system computes a function $f(B, M)$ whose output is a pair of sets T and S, where T includes benefit data for every combination of N auxiliary structures and L memory sizes, and S includes entries that identify the particular auxiliary structures that provide the benefit for the corresponding entry in T. The final item in T is the optimal benefit and the final item in S indicates the structures that provide the optimal benefit.

Figure 4:
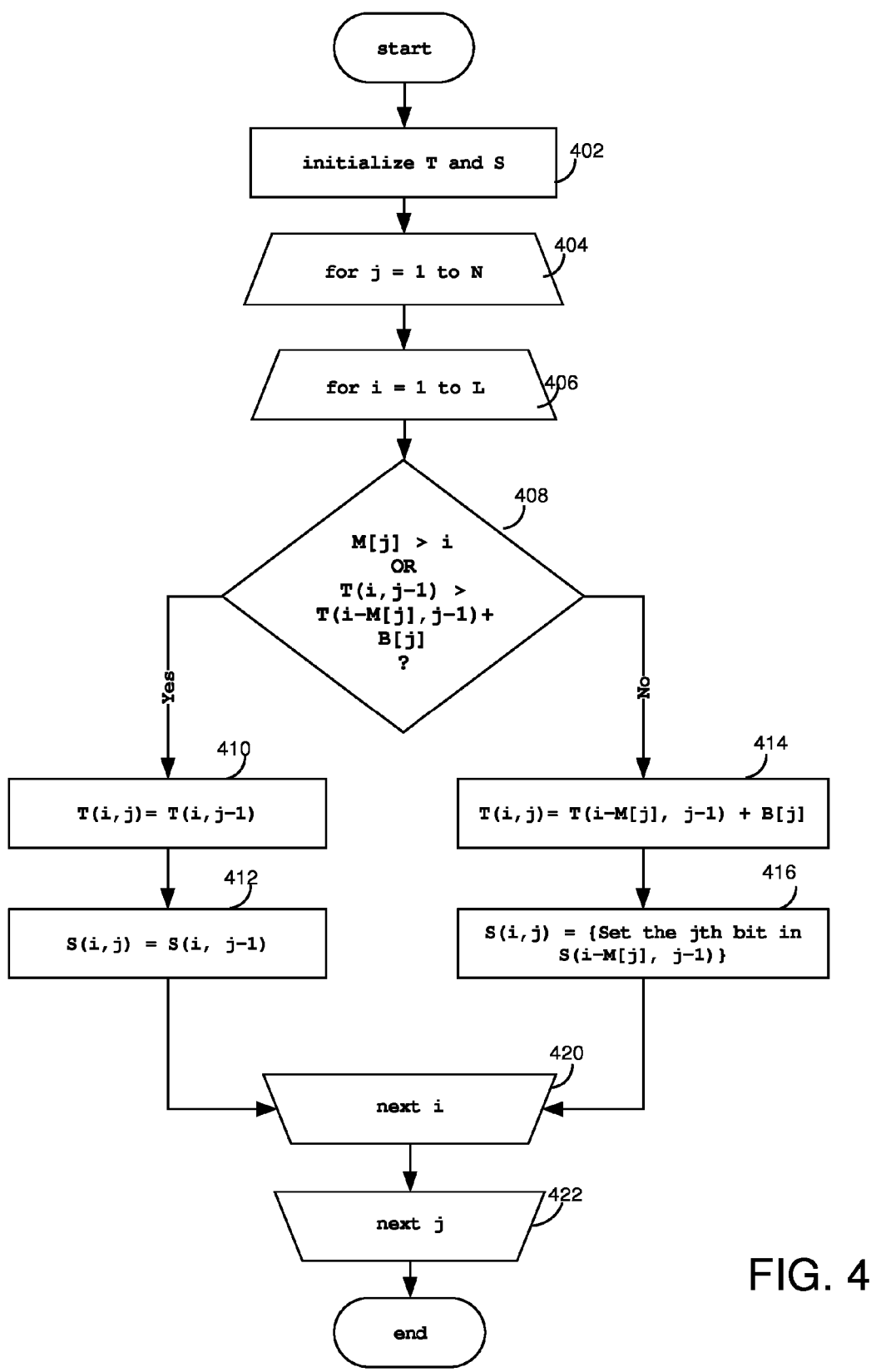
FIG. 4 depicts an example process for determining the cost and benefit of an auxiliary structure.

In one embodiment, the function $f(M, B)$ is the one depicted in FIG. 4. In that function, the sets $S(L, N)$, $T(L, N)$ are implemented, respectively, as two dimensional arrays $S(i, j)$, $T(i, j)$ where $i=[0 \ldots L]$ and $j=[0 \ldots N]$. In step 402, the T and S arrays are initialized by setting $\forall j.T(0,j)=0$ and $\forall i.T(i, 0)=0$ and by clearing bits $\forall j.S(0,j)$ and $\forall i.S(i, 0)$. Two loops, one with $j=1 \ldots N$ and $i=1 \ldots L$ are initialized in steps 404, 406. The outer loop, j, steps through the number of possible denormalizations and the inner loop i, steps though the sizes of memory up to the maximum size L. Thus, the outer loop selects a denormalization and the inner loop examines the cost and benefit of the selected denormalization for each memory size. In step 408, the function performs a test on $M[j]$ and on $T(i-M[j],j-1)$. If $$M[j] > i \quad (3)$$

then the number of memory chunks for the jth denormalization is greater than the current size of the memory. If $$T(i,j-1) > T(-M[j],j-1) + B[j] \quad (4)$$

then the benefit of the previous denormalization is greater than the current one. In either case there is no added benefit, so the function carries forward the current benefit and previous set of denormalizations by copying the previous benefit to the current benefit in step 410 and the previous set of denormalizations providing the previous benefit to the current set in step 412, as depicted below.

$$T(i,j)=T(i,j-1) \tag{5}$$

$$S(i,j)=S(i,j-1) \tag{6}$$

Otherwise, in steps 414 and 415, the function updates $$T(i,j)=T(-M[j],j-1)+B[j] \tag{7}$$

$$S(i,j)=\{\text{Set the jth bit in } S(i-M[j],j-1)\}, \tag{8}$$

the current benefit amount T (i,j) and the current set S(i,j) of denormalizations providing that benefit. When the function completes, the array entry T(L, N) has the maximum benefit for the given memory size L and the array entry S has the set of denormalizations providing that benefit.

As an example, suppose that a particular auxiliary structure at j=1 has a benefit of 5 and uses 7 chunks of memory. When the cost is too large (7>[1 ... 6]), the previous column to be copied to the current column. When the cost is not too large (7⊁[ 8 ... L]), then T is updated with the benefit 5, and S has its bitmap updated to indicate that structure j provided the benefit. Each succeeding row in T is updated with the benefit 5 and each bit map is updated in S, until the final row in the column is reached.

Runtime Encoding

The system encodes, in real-time, each candidate column $C_j$ with the encoding selected for the column. This means that while the system is processing in-coming queries it is also encoding columns in relations that may be the subject of an in-coming query.

Figure 5:
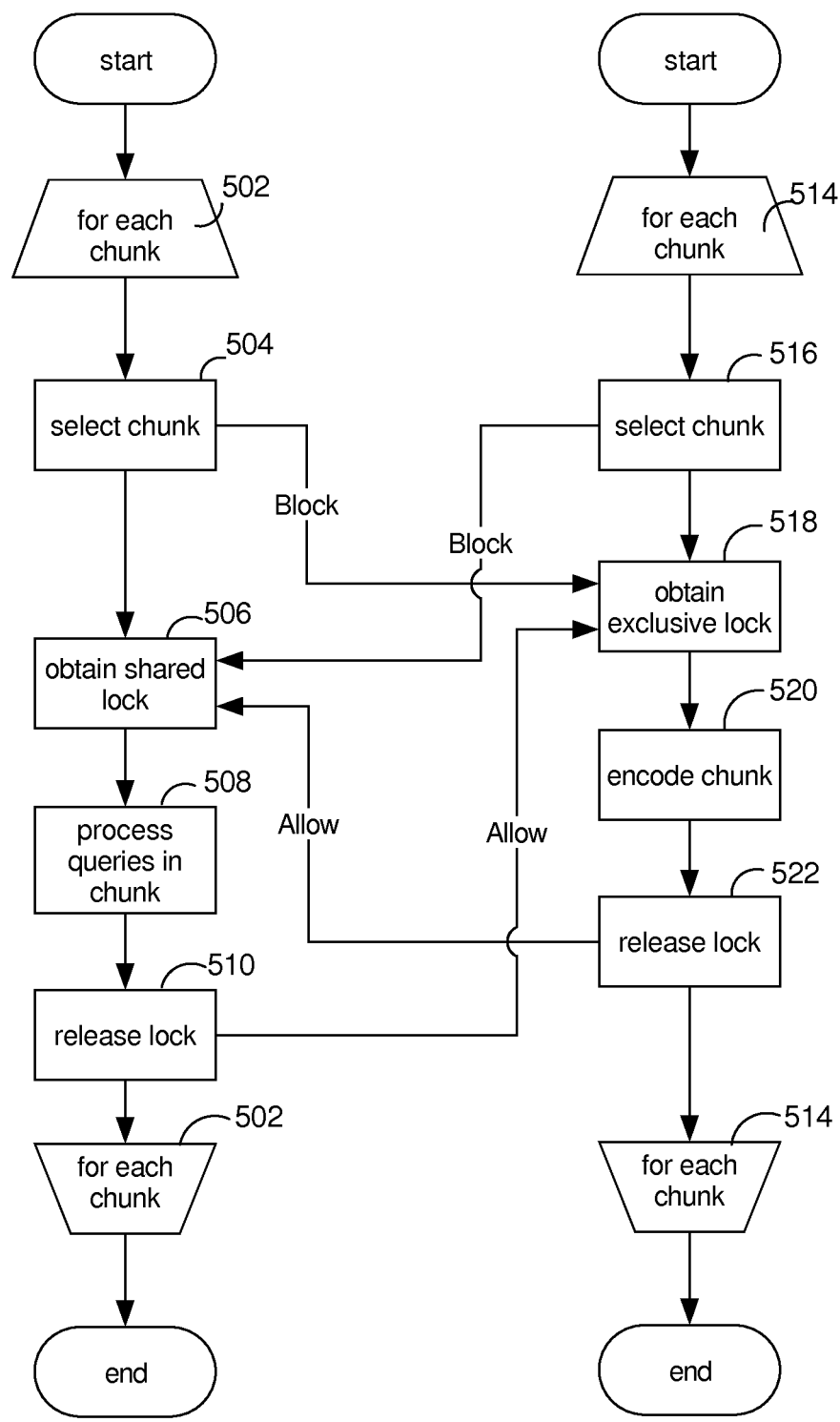
FIG. 5 depicts an example process for performing run-time encoding during query processing.

To get the encoding process and the query processing to cooperate with each other, memory is partitioned into a set of chunks, query processing operates serially over the chunks, and each type of processing obtains a lock to operate on one of the chunks, as depicted in FIG. 5. When query processing reaches a particular chunk in step 504, it obtains a shared lock on the chunk in step 506 and processes the queries in the chunk in step 508, after which in step 510 it releases the lock. When the encoding process reaches on a chunk as in step 516, it obtains an exclusive lock on the chunk in step 518. If query processing has obtained a shared lock on a particular chunk, then if the encoding process reaches the same chunk as in step 516, it must wait for the shared lock to be released, as in step 510. If the encoding process has obtained an exclusive lock on a particular chunk as in step 518, then if the query processing reaches the same chunk as in step 504, it must wait for the exclusive lock to be released as in step 522. Though the arrangement may limit performance of the query processing, it allows the encoding to proceed so that gains from the encoding can be realized.

System Setting

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
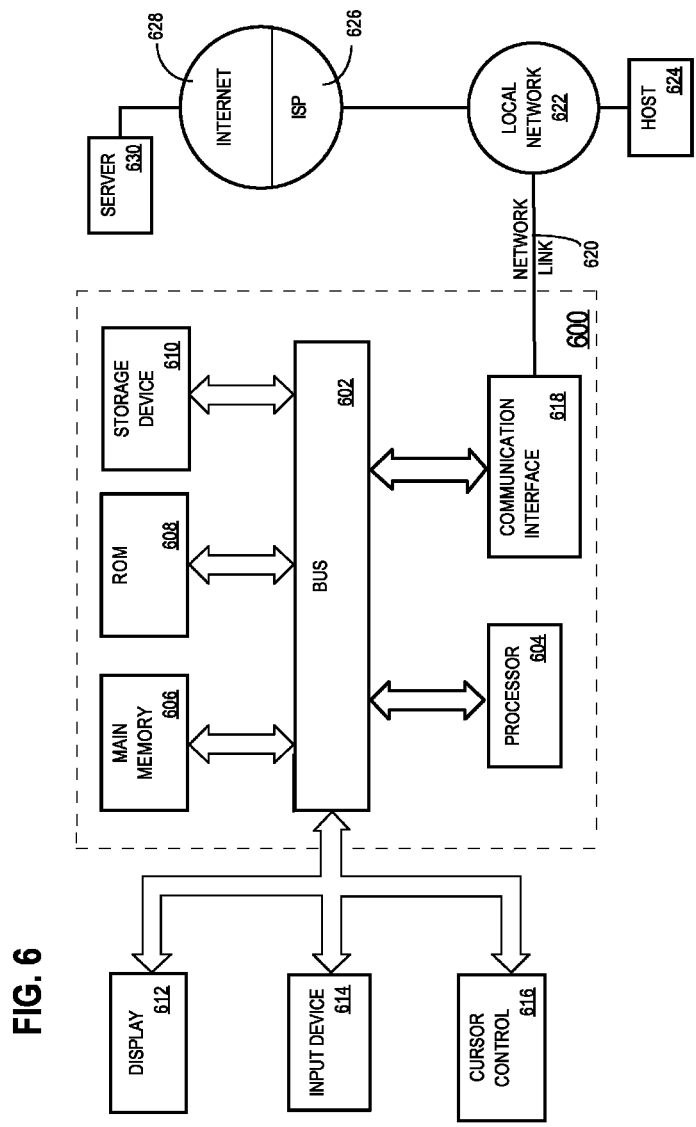
FIG. 6 depicts an example system setting.

For example, FIG. 6 is a block diagram that depicts a computer system 600 upon which an embodiment may be implemented. Computer system 600 includes a bus 602 or other communication mechanism for communicating information, and a hardware processor 604 coupled with bus 2902 for processing information. Hardware processor 604 may be, for example, a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, convert computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 2902 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the embodiments, and what is intended by the applicants to be the scope of embodiments, is the literal and equivalent scope of the set of claims that issue from this application, in the specific form in which such claims issue, including any subsequent correction.

What is claimed is:

1. A method for providing an optimized data representation of relations for in-memory database query processing, the method comprising:
   selecting a column from a set of columns stored in an in-memory database;
   gathering, for each operation type of a set of operation types, query workload statistics collected for query operations of each operation type in a query workload;
   determining two or more candidate encodings for encoding data stored in the column;
   computing, for the column, a cost for each candidate encoding of the two or more candidate encodings;
   wherein the cost for said each candidate encoding of the two or more candidate encodings is based on a cost of each operation type for said each candidate encoding of the two or more candidate encodings that is determined based on the query workload statistics gathered for said each operation type;
   wherein the cost for said each operation type for said each candidate encoding of the two or more candidate encodings is based on a length, for a plurality of rows, of data stored in the column when encoded using said each candidate encoding; and
   selecting, from the two or more candidate encodings, a selected encoding for encoding data stored in the column based on the cost for said each candidate encoding of the two or more candidate encodings;
   wherein the method is performed by one or more computing devices.

2. The method of claim 1, wherein the cost for said each operation type for said each candidate encoding of the two or more candidate encodings is based on an average length for the plurality of rows, of data stored in the column when encoded using said each candidate encoding of the two or more candidate encodings in bytes.

3. The method of claim 1, wherein computing the cost for a particular candidate encoding is based on a sum of the cost for each operation type for said particular candidate encoding over all operation types in the set of operation types.

4. The method of claim 1, wherein the cost for said each candidate type for said each candidate encoding of the two or more candidate encodings is based on a basic cost factor approximated by running one or more pre-designed pieces of code for said each candidate type and said each candidate encoding of the two or more candidate encodings.

5. The method of claim 1, wherein the query workload statistics are based on:
   a number of rows processed by query operations of each operation type,
   query processing time information for query operations of each operation type, and
   selectivity for filters on the column for query operations of each operation type.

6. The method of claim 1, wherein the query workload statistics include a fraction of query processing time taken by query operations of each operation type of the set of operation types in the query workload.

7. The method of claim 1, further comprising
encoding the column with the selected encoding while in-memory database query processing is occurring.

8. The method of claim 1, further comprising:
determining a set of auxiliary data structures for assisting in performing in-memory database query processing;
computing a benefit of each auxiliary data structure in the set of auxiliary data structures;
computing an amount of memory for each auxiliary data structure in the set of auxiliary data structures; and
determining an optimized set of auxiliary data structures that has a lowest cost while fitting in a specified amount of memory.

9. The method of claim 8, wherein the set of auxiliary data structures comprises at least one of a B-tree, a sorted representation, a bit map, and a Bloom filter.

10. The method of claim 8,
wherein the specified amount of memory is divided into a number of equal-sized chunks; and
wherein the amount of memory needed for each auxiliary data structure is a number of memory chunks for each auxiliary data structure.

11. The method of claim 8, wherein the benefit of each auxiliary data structure is based on a function of an improvement for said each operation type, a number of rows for said each operation type on the column, and a query cost fraction for the column.

12. The method of claim 1, wherein the cost for said each candidate type for each candidate encoding of the two or more candidate encodings is based on query processing time information for query operations of each operation type.

13. The method of claim 1, wherein the cost for said each candidate type for each candidate encoding of the two or more candidate encodings is based a number of rows processed by query operations of each operation type.

14. A non-transitory computer readable medium storing one or more sequences of instructions for providing optimized data representation of relations for in-memory database query processing, wherein execution of the one or more sequences of instructions by one or more processors causes the one or more processors to perform the steps of:
selecting a column from a set of columns stored in an in-memory database;
gathering, for each operation type of a set of operation types, query workload statistics collected for query operations of each operation type in a query workload;
determining two or more candidate encodings for encoding data stored in the column;
computing, for the column, a cost for said each candidate encoding of the two or more candidate encodings of the two or more candidate encodings;
wherein the cost for said each candidate encoding of the two or more candidate encodings is based on a cost of each operation type for said each candidate encoding of the two or more candidate encodings that is determined based on the query workload statistics gathered for said each operation type;
wherein the cost for said each operation type for said each candidate encoding of the two or more candidate encodings is based on a length, for a plurality of rows, of data stored in the column when encoded using said each candidate encoding of the two or more candidate encodings; and
selecting, from the two or more candidate encodings, a selected encoding for encoding data stored in the column based on the cost for said each candidate encoding of the two or more candidate encodings.

15. The non-transitory computer readable medium of claim 14, wherein the cost for said each operation type for each candidate encoding of the two or more candidate encodings is based on an average length for the plurality of rows, of data stored in the column when encoded using said each candidate encoding of the two or more candidate encodings in bytes.

16. The non-transitory computer readable medium of claim 14, wherein computing the cost for a particular candidate encoding is based on a sum of the cost for each operation type for said particular candidate encoding over all operation types in the set of operation types.

17. The non-transitory computer readable medium of claim 14, wherein the cost for said each operation type for each candidate encoding of the two or more candidate encodings is based on a basic cost factor approximated by running one or more pre-designed pieces of code for said each candidate type and said each candidate encoding of the two or more candidate encodings.

18. The non-transitory computer readable medium of claim 14, wherein the query workload statistics are based on:
a number of rows processed by query operations of each operation type,
query processing time information for query operations of each operation type, and
selectivity for filters on the column for query operations of each operation type.

19. The non-transitory computer readable medium of claim 14, wherein the query workload statistics include a fraction of query processing time taken by query operations of each operation type of the set of operation types in the query workload.

20. The non-transitory computer readable medium of claim 14, further comprising instructions which when executed cause the one or more processors to perform the step of encoding the column with the selected encoding while in-memory database query processing is occurring.

21. The non-transitory computer readable medium of claim 14, further comprising instructions which when executed cause the one or more processors to perform the steps of:
determining a set of auxiliary data structures for assisting in performing in-memory database query processing;
computing a benefit of each auxiliary data structure in the set of auxiliary data structures;
computing an amount of memory for each auxiliary data structure in the set of auxiliary data structures; and
determining an optimized set of auxiliary data structures that has a lowest cost while fitting in a specified amount of memory.

22. The non-transitory computer readable medium of claim 21,
wherein the set of auxiliary data structures comprises at least one of a B-tree, a sorted representation, a bit map, and a Bloom filter.

23. The non-transitory computer readable medium of claim 21,
wherein the specified amount of memory is divided into a number of equal-sized chunks; and
wherein the amount of memory needed for each auxiliary data structure is a number of memory chunks for each auxiliary data structure.

24. The non-transitory computer readable medium of claim 21, wherein the benefit of each auxiliary data structure is based on a function of an improvement for said each operation type, a number of rows for each operation type on the column, and a query cost fraction for the column.

25. A system for providing an optimized data representation of relations for in-memory database query processing, the system comprising:
   one or more processors; and
   a storage device coupled to each processor and containing instructions causing the one or more processors to perform:
      selecting a column from a set of columns stored in an in-memory database;
      gathering, for each operation type of a set of operation types, query workload statistics collected for query operations of each operation type in a query workload, wherein said query workload statistics are based on:
         a number of rows processed by query operations of each operation type,
         query processing time information for query operations of each operation type, and
         selectivity for filters on the column for query operations of each operation type;
      determining two or more candidate encodings for encoding data stored in the column;
      computing, for the column, a cost for said each candidate encoding of the two or more candidate encodings of the two or more candidate encodings;
      wherein the cost for said each candidate encoding of the two or more candidate encodings is based on a cost of each operation type for said each candidate encoding of the two or more candidate encodings that is determined based on the query workload statistics gathered for said each operation type;
      wherein the cost for said each operation type for said each candidate encoding of the two or more candidate encodings is based on a length, for a plurality of rows, of data stored in the column when encoded using said each candidate encoding of the two or more candidate encodings; and
      selecting, from the two or more candidate encodings, a selected encoding for encoding data stored in the column based on the cost for said each candidate encoding of the two or more candidate encodings.

* * * * *